(12) United States Patent
Rowe et al.

(10) Patent No.: US 9,607,740 B2
(45) Date of Patent: *Mar. 28, 2017

(54) HARD-SOFT MAGNETIC MNBI/SIO$_2$/FECO NANOPARTICLES

(71) Applicant: Toyota Jidosha Kabushiki Kaisha, Toyota-shi, Aichi-Ken (JP)

(72) Inventors: Michael Paul Rowe, Pinckney, MI (US); Ryan Daniel Desautels, Winnipeg (CA)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 303 days.

This patent is subject to a terminal disclaimer.

(21) Appl. No.: 14/270,619

(22) Filed: May 6, 2014

(65) Prior Publication Data

US 2015/0325346 A1    Nov. 12, 2015

(51) Int. Cl.
*H01F 1/01* (2006.01)
*H01F 41/00* (2006.01)
*H01F 41/24* (2006.01)
*H01F 1/00* (2006.01)
*H01F 1/04* (2006.01)
*C01G 49/00* (2006.01)
*B22F 1/00* (2006.01)
*B22F 1/02* (2006.01)
*H01F 7/02* (2006.01)

(52) U.S. Cl.
CPC .......... *H01F 1/0054* (2013.01); *B22F 1/0018* (2013.01); *B22F 1/02* (2013.01); *C01G 49/009* (2013.01); *H01F 1/01* (2013.01); *H01F 1/04* (2013.01); *C01P 2004/62* (2013.01); *C01P 2004/64* (2013.01); *C01P 2006/42* (2013.01); *H01F 7/02* (2013.01); *Y10T 428/12028* (2015.01); *Y10T 428/2993* (2015.01)

(58) Field of Classification Search
None
See application file for complete search history.

(56) References Cited

U.S. PATENT DOCUMENTS

2013/0342069 A1   12/2013  Rowe
2014/0027667 A1   1/2014   Rowe
2014/0035713 A1   2/2014   Rowe

OTHER PUBLICATIONS

U.S. Appl. No. 14/270,752, filed May 6, 2014, Rowe, et al.
U.S. Appl. No. 14/296,917, filed Jun. 5, 2014, Rowe, et al.
U.S. Appl. No. 13/942,116, filed Jul. 15, 2013, Rowe, et al.
U.S. Appl. No. 13/921,878, filed Jun. 19, 2013, Rowe.
U.S. Appl. No. 13/900,860, filed May 23, 2013, Rowe.
U.S. Appl. No. 14/025,033, filed Sep. 12, 2013, Rowe.
U.S. Appl. No. 14/252,036, filed Apr. 14, 2014, Rowe, et al.
U.S. Appl. No. 14/521,063, filed Oct. 22, 2014, Rowe, et al.

*Primary Examiner* — Alexandre Ferre
(74) *Attorney, Agent, or Firm* — Oblon, McClelland, Maier & Neustadt, L.L.P.

(57) ABSTRACT

Core-shell-core nanoparticles of an iron-cobalt alloy core, a silica shell and a manganese bismuth alloy core or nanoparticle on the surface of the silica shell (FeCo/SiO$_2$/MnBi) are provided. The core-shell-core nanoparticles are alternative materials to rare-earth permanent magnets because of the hard magnetic manganese bismuth in nanometer proximity to the soft magnetic iron cobalt.

8 Claims, 3 Drawing Sheets

HARD-SOFT MAGNETIC MNBI/SIO₂/FECO NANOPARTICLES

BACKGROUND OF THE INVENTION

Field of the Invention

The present invention relates to magnetic nano-aggregation of nanoparticles having an iron cobalt alloy core with an intermediate silica shell and manganese bismuth alloy nanoparticles dispersed throughout. These nanoparticles combine a soft magnetic MnBi and provide a nanoparticle material suitable for preparation of a permanent magnet that is a rare-earth-element-free alternative to the standard neodymium iron borate permanent magnet material.

Discussion of the Background

The inventors are conducting a research program investigating both soft and hard magnetic materials obtained with nanoparticle materials obtained from wet chemical synthetic processes. Thus U.S. application Ser. No. 14/025,033, filed Sep. 12, 2013, discloses MnBi nanoparticles having a particle size of 5 to 200 nm as a source for hard magnetic materials. Additionally, U.S. Ser. No. 14/252,036, filed Apr. 14, 2014, discloses core-shell nanoparticles having an iron cobalt nanoparticle core of less than 200 nm with a silica shell and metal silicate interface as a source for soft magnetic materials. The disclosures of both Applications are incorporated herein by reference in their entireties.

Magnetic materials generally fall into two classes which are designated as magnetically hard substances which may be permanently magnetized or soft magnetic materials which may be reversed in magnetism at low applied fields. It is important in soft magnetic materials that energy loss, normally referenced as "core loss" is kept to a minimum whereas in hard magnetic materials it is preferred to resist changes in magnetization. High core losses are therefore characteristic of permanent magnetic materials and are undesirable in soft magnetic materials.

Many of today's advancing technologies require an efficient and strong hard magnet as a basic component of the device structure. Such devices range from cellular phones to high performance electric motors and significant effort is ongoing throughout the industry to find materials which not only meet current requirements, but also ever increasing demand for efficient, less expensive and easily produced hard magnet materials.

Conventionally, neodymium iron borate is generally recognized as one of the strongest, best performing hard magnet materials available. However, because this material is based on the rare earth element neodymium, it is expensive and often the available supply is not stable. Accordingly, there is a need for a material which performs equally or better than neodymium iron borate as a hard magnet but which is based on readily available and less expensive component materials.

Magnetic device parts are constructed from powders by compaction of the powders to a defined shape and then sintering the compact at temperatures of 200° C. or higher. Sintering the part following compaction, is necessary to achieve satisfactory mechanical properties in the part by providing particle to particle bonding and hence strength.

Technological advances in all aspects of the communications and power generation fields require ever increasing powerful magnetic powders having controllable or tunable magnetic properties which allow for production of tailored magnetic parts that are economical and readily obtainable.

Thus, an object of the present invention is to provide a hard magnetic powder having high coercivity to produce permanent magnetic parts. The powder must be economical in comparison to conventional permanent magnetic materials and must be readily available.

SUMMARY OF THE INVENTION

These and other objects have been achieved according to the present invention, the first embodiment of which includes a core-shell-core nanoparticle, comprising: a superparamagnetic core comprising an iron cobalt alloy; an intermediate shell of a silicon dioxide coating the core; another nanoparticle core of manganese bismuth alloy on the intermediate silicon dioxide shell; and a metal silicate interface layer between the core and the silicon dioxide shell; wherein a diameter of the iron cobalt alloy core is 200 nm or less.

In one embodiment the diameter of the MnBi core may be from 0.5 to 200 nm

In an aspect of either of the above embodiments, the metal silicate interface may be from 0.5 to 10 nm in thickness and the thickness may be controlled by length of time of the wet synthesis to prepare the silicon dioxide shell.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

Figure 1:
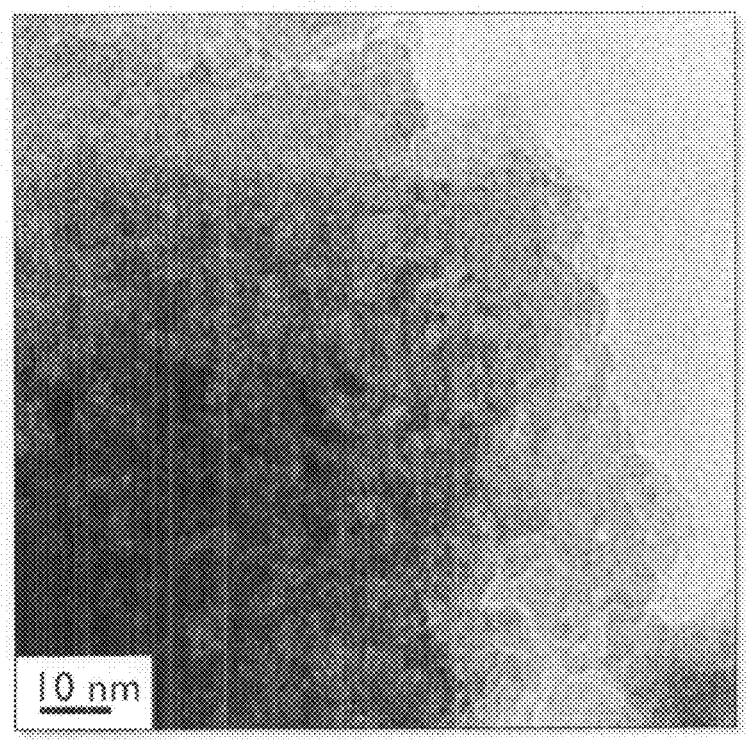
FIG. 1 shows a TEM image of the core-shell-core nanoparticles prepared in the Example.

Throughout this description all ranges described include all values and sub-ranges therein, unless otherwise specified.

Additionally, the indefinite article "a" or "an" carries the meaning of "one or more" throughout the description, unless otherwise specified.

In an ongoing study of magnetic materials and particularly nanoparticle magnetic materials, the present inventor has identified manganese bismuth alloy in a nanoparticle form as a material having potential utility as a replacement of neodymium iron borate for manufacture of permanent magnets. MnBi nanoparticles were predicted to express coercivities as high as 4 T. The invention disclosed in U.S. application Ser. No. 14/025,033, filed Sep. 12, 2013, discloses some results of that work.

The inventors are also conducting ongoing studies with soft magnetic nanoparticle materials such as disclosed in U.S. Ser. No. 14/252,036, filed Apr. 14, 2014, wherein core-shell nanoparticles having an iron cobalt nanoparticle core of less than 200 nm with a silica shell and metal silicate interface are disclosed.

In ongoing research with these and other systems, the inventors have surprisingly discovered core-shell-core nanoparticles obtained by application of a manganese bismuth nanocoating to a FeCo alloy core silica coating core-shell nanoparticle provides a material having highly tunable magnetic properties according to the relative size and nature of each of the core-shell-shell components. Such a complex combination of soft and hard magnetic components within one nanoparticle is novel and offers many opportunities for discovery and development of new magnetic materials and devices.

In a first embodiment, the present invention includes core-shell-core nanoparticle, comprising:
a superparamagnetic core comprising an iron cobalt alloy;
an intermediate shell of a silicon dioxide coating the core;
an outer manganese bismuth alloy nanoparticle, also referred to as a core based on the spherical nano-scale nature of the MnBi nanoparticle on the intermediate silicon dioxide shell; and
a metal silicate interface layer between the core and the silicon dioxide shell;
wherein a diameter of the iron cobalt alloy core is 200 nm or less.

The inventors have discovered that the formation of individual FeCo alloy nanoparticles coated with silica shells of various thicknesses may be achieved via a scalable wet chemical process. Surprisingly, the inventors have discovered that formation of interfacial metal silicates may alter significantly the nanomagnetism in these ultra-high surface area FeCo alloy nanoparticle systems. Evidence that an interfacial layer of metal silicates had formed was observed in x-ray photoelectron spectra collected over the 2p transitions of Fe and Co; and as the thickness of the silica shell was increased (by altering the duration of the silica reaction) a thicker interfacial metal silicate layer was formed, increasing the nanoparticles' overall magnetic anisotropy, as evidenced by increased blocking temperatures and altered coercivities. Thus the inventors have surprisingly discovered that by producing superparamagnetic iron cobalt alloy nanoparticles that are encapsulated in silica shells with varying degree of wet synthesis treatment time, core shell FeCo nanoparticles having differing nanomagnetic properties may be obtained. In certain embodiments the diameter of the iron cobalt alloy nanoparticle core is 100 nm or less, and in further embodiments the diameter of the iron cobalt alloy nanoparticle core is from 2 nm to 50 nm.

According to the invention, the iron cobalt alloy nanoparticle grains are of or approaching the size of the single particle magnetic domain of the iron cobalt alloy and thus are superparamagnetic. While not being constrained by theory, the inventors believe control of grain size to approximately that of the particle magnetic domain is a factor which contributes to the reduced hysteresis of a magnetic core according to the present invention. Moreover, the presence of insulating silica shells about the core grains is a factor which contributes to the low eddy current formation of a magnetic core according to the present invention.

It is conventionally known that the range of particle size for which single domain particles exhibit superparamagnetism has an upper boundary characteristic of the particle chemical composition.

The inventors have discovered that during synthesis of the silicon dioxide shell a metal silicate thin layer interface is coincidently formed. Evidence that an interfacial layer of metal silicates had formed was observed in x-ray photoelectron spectra collected over the 2p transitions of Fe and Co; and as the thickness of the silica shell was increased (by altering the duration of the silica reaction) a thicker interfacial metal silicate layer was formed, increasing the nanoparticles' overall magnetic anisotropy, as evidenced by increased blocking temperatures and altered coercivities. The inventors have recognized that an understanding of the effect of this interfacial metal silicate layer to control magnetic properties is a key element to effective utility of these materials in applications as low-loss transformer cores.

In a study of the FeCo alloy core shell nanoparticles, the inventors have discovered that interfacial metal silicates formed during the silicon dioxide shell coating synthesis, alter the overall magnetic anisotropy of the nanoparticles as a higher anisotropy phase that is a combination of Fe- and Co-based silicates that acts to increase the 'magnetically active volume' of the nanoparticles compared to a bare FeCo nanoparticle.

Binary alloy FeCo single-magnetic-domain nanoparticle samples were synthesized (see Example), with the exception of varying the duration of the $SiO_2$ reaction times, which led to $SiO_2$ shells of varying thickness: a 1 min reaction time produced a 3 nm thick shell, 10 minutes a 4 nm thick shell, and 20 minutes a 6 nm thick shell. The average FeCo nanoparticle diameter and $SiO_2$ shell thickness were determined and for all three core/shell nanoparticle samples ($FeCo/SiO_2$ (3 nm), $FeCo/SiO_2$ (4 nm), and $FeCo/SiO_2$ (6 nm)), the average FeCo core diameter was found to be 4±1 nm indicating a high degree of reproducibility in the nanoparticle core synthesis. The thicknesses of the silica shells were determined in a similar manner and found to be 3±1 nm, 4±1 nm, and 6±1 nm for the $FeCo/SiO_2$ (3 nm), $FeCo/SiO_2$ (4 nm), and $FeCo/SiO_2$ (6 nm) samples, respectively. From the TEM images, it was observed that the FeCo cores were covered completely by the silica shells. Analysis of X-ray diffraction patterns indicated the presence of both Fe and Co silicates. However, the relative proportions appear to be variable and although not wishing to be constrained by theory, the inventors believe that metal silicate content may be related to the thermodynamic energy of formation of the metal silicate. The studies showed that Fe- and Co-silicates formed at the interface between the FeCo nanoparticle core and the $SiO_2$ shell during the synthesis process. However, the relative integrated areas of the $Fe^0$ and $Co^0$ metallic peaks of the different core/shell nanoparticle systems indicated Fe-silicates may be formed preferentially over Co-silicates.

Nanoparticles of Fe—/$SiO_2$ may be synthesized by the ethanolic reaction of sodium borohydride with iron dichloride and cobalt dichloride in a solution of sodium hydroxide and tetraoctylammonium bromide. The obtained nanoparticles may be treated with tetraethyl orthosilicate, in water ethanol mixture using triethylamine as the base-catalyst, to form silica shells. These particles may then be purified using an aqueous ethanol rinse.

As indicated, the length of the treatment of the Fe—Co nanoparticles determines the width of the silicon dioxide coating and correspondingly, the width of the metal silicate layer. The longer the treatment time, the greater the amount of the coating and the greater the width of the metal silicate layer.

The synthesis may be conducted for such time as necessary to prepare a metal silicate layer of 0.5 to 20 nm, preferably 0.8 to 10 nm and most preferably 1.0 to 8 nm.

The manganese-bismuth alloy coating may be formed by a method comprising in the presence of the FeCo silica core shell nanoparticles, treating Mn powder with a hydride reducing agent and combining by ball milling; adding a solution of a bismuth salt of a long chain carboxylate and alkyl amine to the Mn-hydride reducing agent mixture while continuing the agitation; upon completion of the bismuth salt solution addition, the agitation is continued to form the core-shell-core $FeCo/SiO_2/MnBi$ nanoparticles.

The ether solvent for the hydride treatment may be any ether compatible with hydride reaction conditions. Suitable ether solvents include tetrahydrofuran (THF), 2-methyltetrahydrofuran, diethyl ether, diisopropyl ether, 1,4-dioxane, dimethoxy ethane, diethylene glycol diethylether, 2-(2-methoxyethoxyl)ethanol and methyl tert-butyl ether. THF may be a preferred solvent.

The hydride reducing agent may be any material capable of reacting with the manganese to form a manganese reducing agent complex and include NaH, LiH, CaH$_2$, LiAlH$_4$ and LiBH$_4$. LiBH$_4$ may be a preferred hydride treatment agent.

The manganese lithium borohydride reducing agent complex formation is accomplished by ball milling the manganese powder and hydride reducing agent at 150 to 400 rpms for up to 4 hours in a planetary ball mill. Variations of this procedure may be optimized to appropriately modify the properties obtained and would be understood by one of ordinary skill in the art.

Additionally, the amount of hydride treatment agent may be varied to modify conditions and the properties of the nanoparticles obtained and may vary in an equivalent ratio of hydride to Mn of from 1/1 to 100/1.

The bismuth may be added in any ether soluble salt form and is preferably added as a salt of a long chain carboxylic acid. In a preferred embodiment, the Bi is added as bismuth neodecanoate. The mole ratio of Bi to Mn may vary from 0.8/1 to 1.2/1. Preferably the ratio of Bi/Mn is from 0.9/1 to 1.1/1 and most preferably, the ratio of Bi/Mn is 1/1. The addition time of the bismuth compound may be varied to optimize and modify the size and properties of the MnBi. The width may be from 0.5 to 200 nm, preferably 1.0 to 100 nm and most preferably 2 to 20 nm. Preferably the addition time is less than one hour and in a preferred embodiment the addition time is about 20 minutes.

The alkyl amine is preferably a primary amine having a carbon chain of from 6 to 12 carbons may optionally be added to the reaction.

Figure 2:
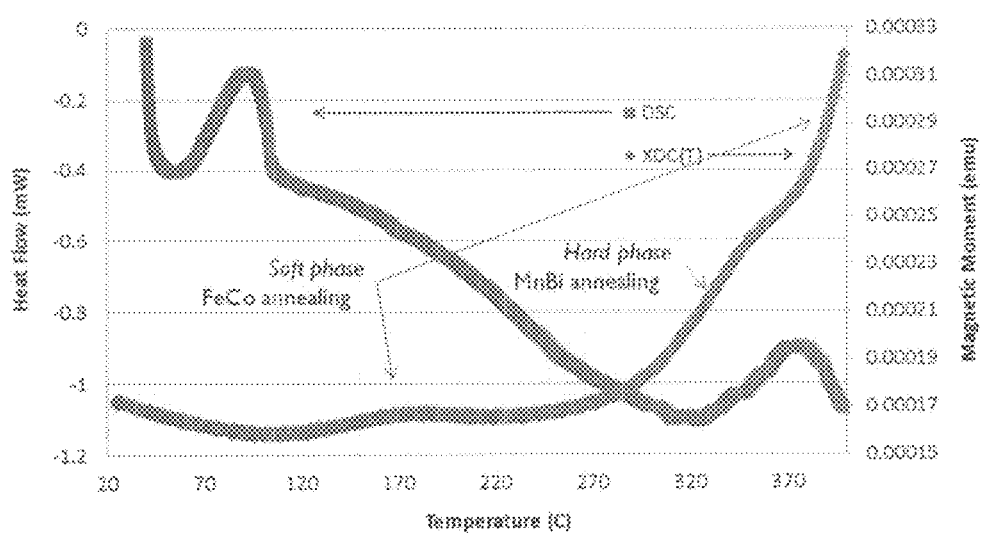
FIG. 2 shows a scan of DSC and M(T) data for the core-shell-core nanoparticles prepared in the Example.

As indicated in FIG. 2, when the core-shell-core nanoparticles of the invention are thermally treated in an annealing process, both the soft phase FeCo and hard phase MnBi anneal at temperatures characteristic of FeCo and MnBi respectively.

Having generally described this invention, a further understanding can be obtained by reference to certain specific examples which are provided herein for purposes of illustration only and are not intended to be limiting unless otherwise specified.

Example

Core-Shell-Core Iron-Cobalt/Silica/Manganese Bismuth Nanoparticles 0.489 g sodium hydroxide, 12.892 g tetraoctylammonium bromide, 10.922 g iron dichloride tetrahydrate, and 12.042 g cobalt chloride hexahydrate were dissolved in 250 mL of ethanol and placed under argon. A solution of 12.258 g sodium borohydride dissolved in 450 mL ethanol was then added to the iron cobalt mixture. Upon completion of the borohydride addition the reaction mixture was diluted with 100 mL of water. The product FeCo nanoparticles were then washed with 70% water/30% ethanol.

The FeCo nanoparticles were then suspended in a mixture of 625 mL water and 2 mL triethylamine. A solution of 0.5 mL of tetraethylorthosilicate in 390 mL ethanol was then added to the FeCo suspension and the obtained mixture allowed to react for 15 minutes to obtain silica coated nanoparticles. The coated nanoparticles were then washed with ethanol.

The silica-coated FeCo nanoparticles (0.27 g) were suspended in 200 mL THF. 0.152 g heptylcyanide, 0.008 g lithium borohydride, and 0.012 g Mn(LiBH$_4$)$_2$ were added to the FeCo nanoparticle suspension. A solution of 0.082 g of bismuth neodecanoate in 15 mL THF was then added dropwise to the stirring suspension. The product was finally washed with THF.

A TEM image of the prepared core-shell-core nanoparticles is shown in FIG. 1.

Figure 3:
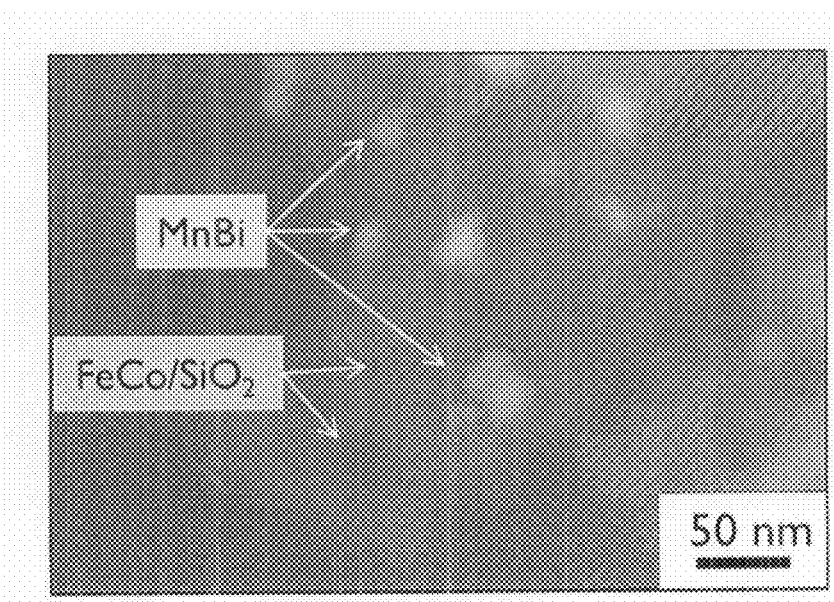
FIG. 3 shows a Z-contrast TEM image of the core-shell-core nanoparticles prepared in the Example.

The Z-contrast TEM image of FIG. 3 shows how the MnBi phase has an island distribution throughout the FeCo/SiO2.

FIG. 2 shows DSC and M(T) data over the temperature ranges where the observed properties, from both data sets, show the distinct presence of the FeCo soft magnetic phase and MnBi hard magnetic phase, thus confirming the presence of both in the core-shell-core nanostructure.

The invention claimed is:

1. A core-shell-core nanoparticle system, comprising:
a superparamagnetic core comprising an iron cobalt alloy;
an intermediate shell of a silicon dioxide coating the core;
an outer core of manganese bismuth alloy on the intermediate silicon dioxide shell; and
a metal silicate interface layer between the superparamagnetic core and the silicon dioxide shell;
wherein
a diameter of the iron cobalt alloy core is 200 nm or less.

2. The core-shell-core nanoparticle system according to claim 1, wherein a diameter of the MnBi core is from 0.5 to 200 nm.

3. The core-shell-core nanoparticle system according to claim 1, wherein the metal silicate of the interface layer comprises at least one of iron silicate and cobalt silicate.

4. The core-shell-core nanoparticle system according to claim 1, wherein the thickness of the metal silicate interface layer is from 0.5 nm to 15 nm.

5. The core-shell-core nanoparticle system according to claim 1, wherein the superparamagnetic core consists of an iron cobalt alloy.

6. The core-shell-core nanoparticle system according to claim 1, wherein the diameter of the iron cobalt core is from 2 to 75 nm.

7. A method to prepare a core-shell-core FeCo/SiO$_2$/MnBi nanoparticle system, comprising:
co-reducing an iron ion and a cobalt ion from a common solution; and coprecipitating an FeCo alloy nanoparticle to obtain a reduction mixture;
isolating the FeCo nanoparticle from the reduction mix e;
forming a silica coating on the FeCo nanoparticle to obtain a core-shell nanoparticle; and
forming a MnBi alloy nanoparticle on the core-shell nanoparticle by reduction of Bi ions with a Mn and lithium borohydride reducing complex ions to obtain a MnBi alloy nanoparticle on the silica shell.

8. A composition comprising:
a nanoaggregation of FeCo/SiO$_2$ core/shell nanoparticles with islands of MnBi nanoparticles attached to surfaces of the SiO$_2$ shells.

* * * * *